US007401080B2

(12) United States Patent
Benton et al.

(10) Patent No.: US 7,401,080 B2
(45) Date of Patent: Jul. 15, 2008

(54) STORAGE REPORTS DUPLICATE FILE DETECTION

(75) Inventors: James R. Benton, Seattle, WA (US); Ran Kalach, Bellevue, WA (US); Paul Adrian Oltean, Redmond, WA (US); Georgi M. Matev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/206,710

(22) Filed: Aug. 17, 2005

(65) Prior Publication Data

US 2007/0043757 A1    Feb. 22, 2007

(51) Int. Cl.
 *G06F 12/06* (2006.01)
(52) U.S. Cl. .......................................................... 707/7
(58) Field of Classification Search ................. 707/102, 707/101; 709/203
 See application file for complete search history.

(56) References Cited

U.S. PATENT DOCUMENTS

| | | | | |
|---|---|---|---|---|
| 5,680,611 | A * | 10/1997 | Rail et al. .................... | 707/101 |
| 6,547,829 | B1 * | 4/2003 | Meyerzon et al. ........ | 715/501.1 |
| 6,658,423 | B1 * | 12/2003 | Pugh et al. .................. | 707/102 |
| 6,757,675 | B2 * | 6/2004 | Aiken et al. .................... | 707/3 |
| 6,901,413 | B1 * | 5/2005 | Wu ............................ | 707/201 |
| 6,978,419 | B1 * | 12/2005 | Kantrowitz ................. | 715/511 |
| 6,988,124 | B2 * | 1/2006 | Douceur et al. ............. | 709/203 |
| 7,158,961 | B1 * | 1/2007 | Charikar ........................ | 707/2 |
| 2003/0172066 | A1 * | 9/2003 | Cooper et al. .................. | 707/7 |
| 2004/0133589 | A1 * | 7/2004 | Kiessig et al. .............. | 707/102 |
| 2006/0271538 | A1 * | 11/2006 | Mizrachi et al. ............... | 707/7 |

OTHER PUBLICATIONS

Duplic8, http://www.kewlit.com/duplic8/howtouse.html, Feb. 5, 2005, pp. 1-10.*

* cited by examiner

*Primary Examiner*—John Cottingham
*Assistant Examiner*—Sherief Badawi
(74) *Attorney, Agent, or Firm*—Workman Nydegger

(57) ABSTRACT

Described is a storage reports duplicate file detector that operates by receiving file records during a first scan of file system metadata. The detector computes a hash based on attributes in the record, and maintains the hash value in association with information that indicates whether a hash value corresponds to more than one file. In one implementation, the information corresponds to the amount of space wasted by duplication. The information is used to determine which hash values correspond to groups of potentially duplicate files, and eliminate non-duplicates. A second scan locates file information for each of the potentially duplicate files, and the file information is then used to determine which groups of potentially duplicate files are actually duplicate files.

22 Claims, 6 Drawing Sheets

US 7,401,080 B2

STORAGE REPORTS DUPLICATE FILE DETECTION

BACKGROUND

Managing storage in enterprise configurations is a complex process that presents information technology (IT) departments with many challenges. "Storage Reports" is a service comprising a technology/functionality that provides a set of storage reports to be used by IT administrators to efficiently audit and track the usage of large storage volumes. For example, an administrator may want to see a sorted list of all files larger than one-hundred megabytes on a given namespace, sorted by size, and with summary information on totals. Another such report may provide summary information for each file type (e.g., "Media Files") on a given namespace, including the one-hundred largest files within each file type category. Thus, storage reports help an administrator identify inefficient use of storage, implement mechanisms to prevent future misuse, monitor usage patterns and utilization levels on file servers and other servers, anticipate storage needs, analyze emergency situations and take preventive and/or corrective actions.

While storage reports thus provide valuable functionality, generating the storage reports can take a considerable amount of time, and also consume significant input/output (I/O) and processor resources. This is because in general, to generate a storage report requires scanning one or more storage volumes, each of which may be very large, whereby efficient scanning algorithms are desirable.

SUMMARY OF THE INVENTION

Briefly, the present invention is directed towards a method and system by which storage reports provide an administrator with information regarding wasted storage space as a result of file duplication. The invention provides a time and memory efficient method of detecting duplicate files in large file system namespaces by coupling a series of fast file system metadata scans, one to eliminate non-duplicates, and then another to obtain additional information corresponding to potential duplicate files from which actual duplication may be detected.

In one implementation, a storage reports duplicate file detector operates by receiving file records during a first scan of file system metadata. The detector computes a hash based on attributes in the record, and maintains the hash value in association with information that indicates whether a hash value corresponds to more than one file. In one implementation, the information corresponds to the amount of space wasted by duplication. The information is used to determine which hash values correspond to groups of potentially duplicate files, and eliminate non-duplicates. A second scan locates file information for each of the potentially duplicate files, and the file information is then used to determine which groups of potentially duplicate files are actually duplicate files.

Other advantages will become apparent from the following detailed description when taken in conjunction with the drawings, in which:

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
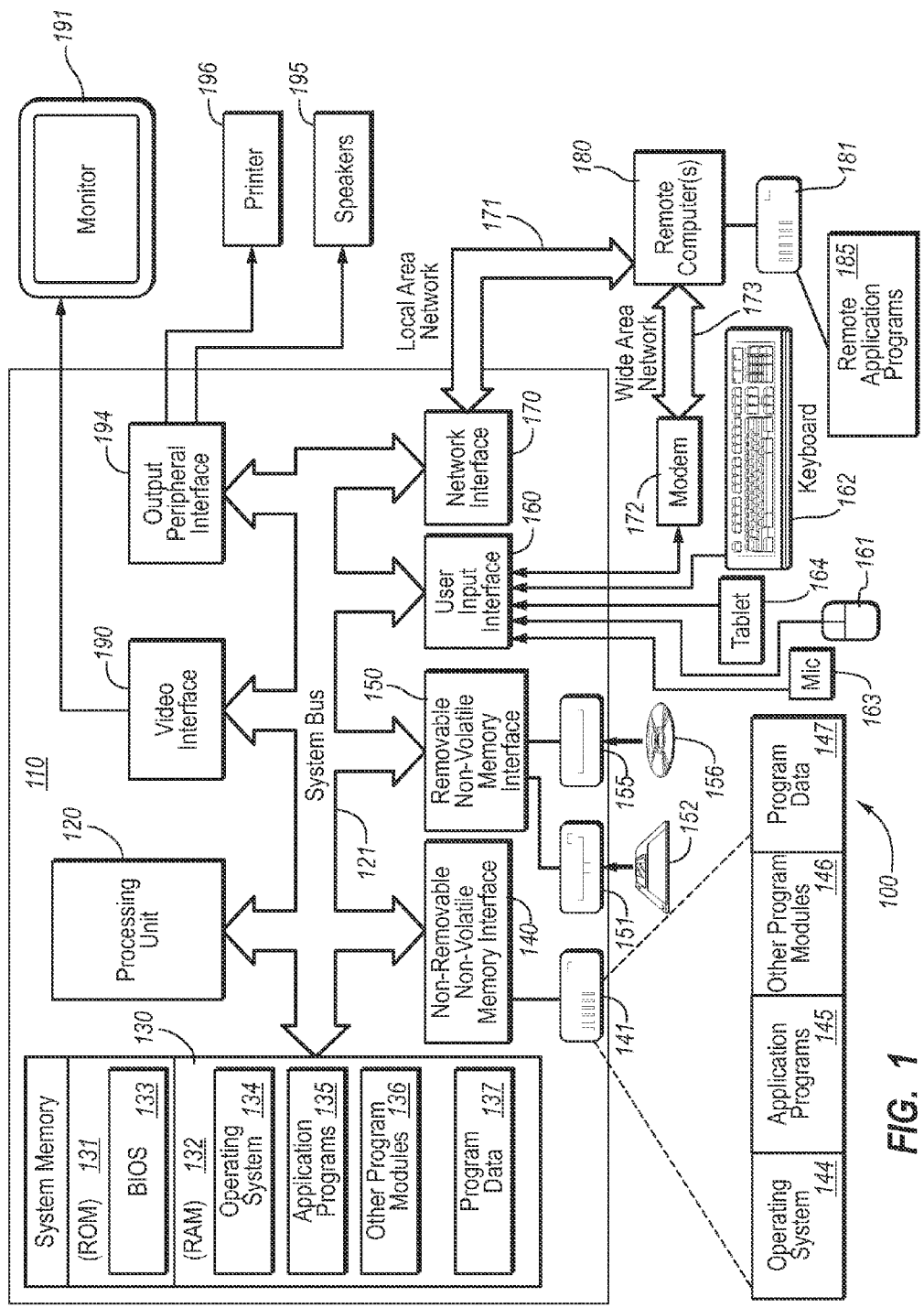
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. The main computer system 120 may store some or all of its data on a storage area network.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage Reports Duplicate File Detection

Detection of file duplicates is an N-squared method; the solution requires that a "duplicate function" be calculated for every file and compared to every other file. Performing this operation on large volumes (millions of files) is challenging because of the storage and processing requirements involved; the results of the duplicate function for each file needs to be saved until all files have been processed. Depending on the definition of the duplicate function, duplicate detection can also result in huge processing overhead from calculating the function on millions of unique files.

Various example aspects of the technology described herein are generally directed towards efficiently generating storage reports containing sets of duplicate files by directly scanning file system metadata. A storage reports engine identifies a volume, of among possibly multiple volumes, along with a set of one or more input namespaces for each volume, where in a hierarchical file system, a namespace comprises the recursive set of files and sub-directories or sub-trees located under an arbitrary directory in the file system.

The storage reports engine initiates a file system metadata scan on each volume, rather than using native operating system/file system query interfaces. Described is a multi-pass, multi-phase file system metadata scan that is efficiently filtered to return to the storage reports engine file information for duplicate files that reside underneath a given set of sub-tree namespaces. As described below, this results in a time and memory efficient method of gathering the required file system information, essentially by coupling an optimal series of sequential direct access read operations on the file system metadata.

As will be understood, numerous ways to implement the present invention are feasible, and only some of the alternatives are described herein. For example, an implementation described herein scans file system metadata arranged in a single database per volume, such as a master file table (MFT) in a Microsoft®-based file system (NTFS). However, the present invention will provide benefits with virtually any arrangement or organization of file system metadata. As such, the present invention is not limited to any of the examples used herein, but rather may be used numerous ways that provide benefits and advantages in computing in general.

Figure 2:
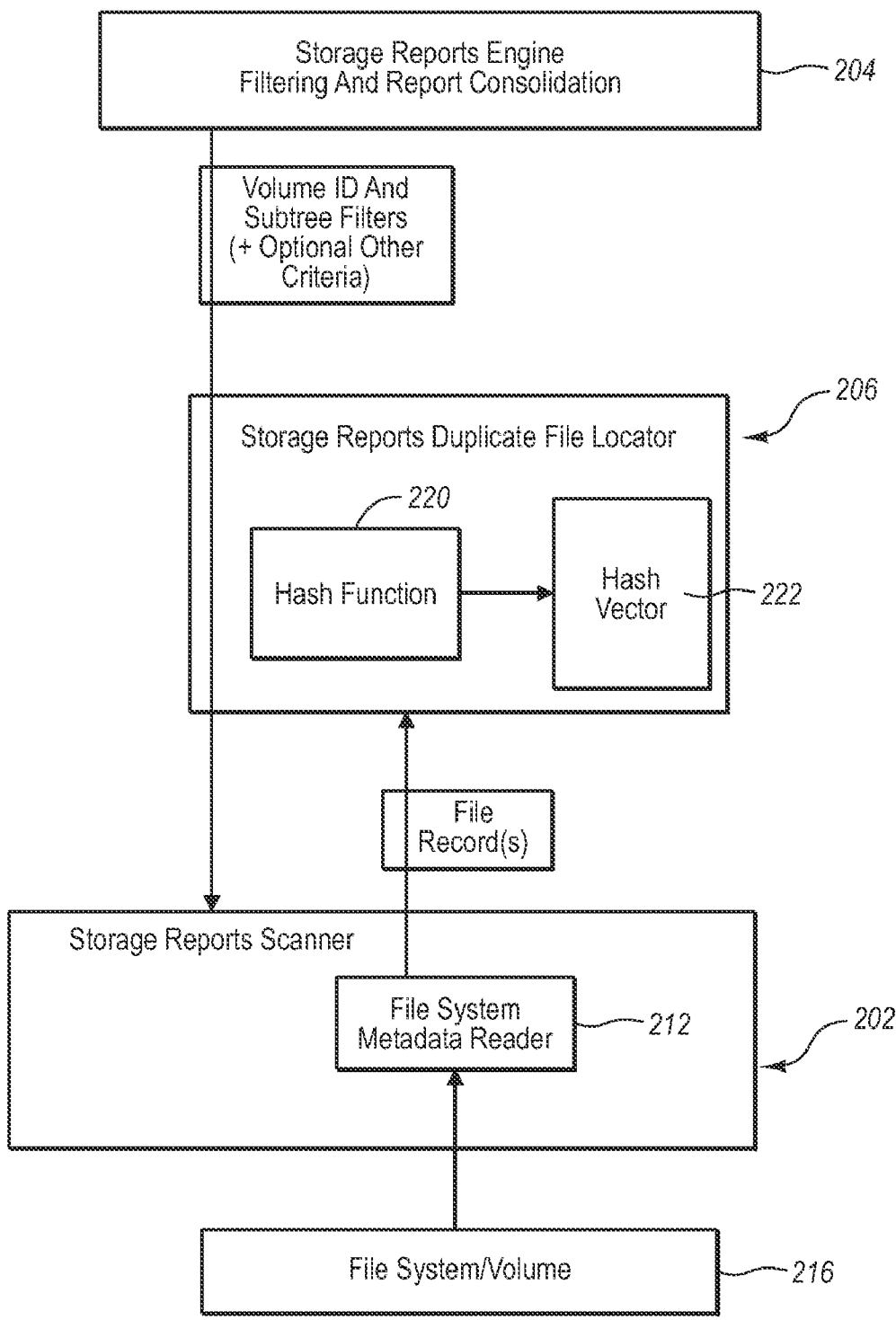
FIG. 2 is a block diagram representing various components for efficient execution of a first volume scan used to generate storage reports of duplicate files, in accordance with various aspects of the present invention.

Turning to FIG. 2 of the drawings, there is shown an example implementation comprising a storage reports scanner 202 coupled to a storage reports engine 204. In general, the storage reports scanner 202 reads the file system information, filters the information based on namespace location and delivers this information to the storage reports engine 204. One suitable storage reports scanner is described in copending U.S. patent application entitled "Storage Reports File System Scanner" assigned to the assignee of the present invention and filed concurrently herewith.

The storage reports engine 204 identifies the file system volumes that need to be scanned, coordinates the storage reports scanner on each of these volumes, filters file information, and multiplexes information for a single file to multiple storage reports (report correlation). Note that the division of functionality and structure between these components is somewhat arbitrary, and it is also equivalent to have the functionality and structure implemented in a single component or in more components than the two components 202, 204 shown.

For each volume to scan, the storage reports scanner 202 takes at least two pieces of information from the storage reports engine, namely the file system volume ID, which can be a live volume or shadow copy volume, and a list of namespaces (subtree filters) to identify the duplicate files of interest on that volume or set of volumes. In addition, other filtering criteria, such as the total number of filename sets to return (e.g., 1,000) of those that waste the most space, and/or a threshold space wasting value (e.g., sets of filenames that waste more than 100 MB), may be provided to the storage reports scanner 202.

Note that in one implementation, the algorithm is designed to find files that can be duplicated across multiple volumes (that is, to not just find duplicate files within a single volume). To this end, a single hash key vector is maintained across multiple volumes, and the scan phases for each volume are interleaved. For example, to find duplicates in C:\ and D:\, then the order of scans may comprise an initial scan of C:\, an initial scan of D:\ (which may be in parallel, at least partially, with the initial scan of C:\), the second scan of C:\, and the second scan of D:\ (which may be in parallel, at least partially, with the second scan of C:\).

As represented in FIG. 2, the storage reports engine 202 is associated with a storage reports duplicate file locator (or simply duplicate file locator) 206. In one implementation, the duplicate file locator comprises a sub-component of the storage reports engine 204, and is responsible for identifying the duplicate file groups on a file system volume or a sub-namespace of a file system volume, and presenting this information to the storage reports engine 204 for reporting.

As described below, the duplicate file locator 206 leverages the fast, namespace filtering file system metadata scanner 202 to perform a series of read operations on the entire file system volume or a set of namespaces on the volume. Moreover, to conserve resources, at each scan the function used for duplicate detection may be further refined, up to and optionally including inspecting and comparing actual file content.

More particularly, in an initial file system metadata scan, a hash key is calculated and stored for each file residing in the volume namespace or namespaces of interest. To this end, after initializing the file system scanner 202, e.g., with the file system volume ID and a list of one or more namespaces (subtree filters), a file system metadata reader 212 of the scanner 202 reads the metadata of the file system volume 216 and produces a file record, which is received at the duplicate file locator 206. The flow diagram of FIG. 5 also summarizes these example operations, beginning at step 500 (initialize) and step 502 (receive the record).

At step 504, a hash key value is calculated for the file record based on certain information in the record. One appropriate duplicate function used for the hash function 220 (FIG. 2) is a relatively straightforward hashing function that produces a small (e.g., 64 bit) hash key, although other sizes (e.g., a 32-bit or a 48-bit hash key) may be alternatively used.

One suitable set of information in the record that may be used as the hashing function inputs comprises file attributes of logical file size, allocated file size and last-modified file time. Note that the scanner skips file records of directories that are not interesting for duplicate file detection. Other information may be used, and in general, any information may be used as long as that information remains consistent between duplicate files. For example, an administrator may or may not want filenames to be considered, depending on whether the administrator wants to locate any files that have duplicate contents regardless of whether one or more has been renamed, or wants only sets of duplicate files having the same names and files contents to be detected. Thus, the present invention is not limited to any particular initial key size and/or file attributes for hashing.

Once the hash key value is computed, the value is stored in a hash key vector 222. The remaining file records are similarly processed, adding unique entries to the hash key vector 222, and recording the existence of duplicates that are encountered. While a counter of duplicate hash values may be kept in association with the hash key to record the existence of one or more duplicates, in one implementation the amount of wasted space is kept instead. This is because administrators tend to be more concerned with reclaiming wasted space, rather than how many files have the same contents, e.g., two 100 MB duplicates are (ordinarily) more important to detect than ten 100 KB duplicated files. To this end, in one implementation as generally represented by step 506 of FIG. 5, the first time that a hash key is computed, the amount of wasted space associated with that key is initialized to zero. Thereafter, if that same hash key is calculated for another record, the size (which is identical because the size is a hash input) is added to the current size. For example, three ten megabyte files will waste twenty megabytes, twenty megabytes for the duplicates plus ten megabytes for one copy that would need to be kept if the others were to be deleted; (wasted space equals the number of files minus one, then times the file size). In one implementation, 64 bits are reserved for preserving the wasted space.

Step 508 continues the processing of the file records until the scanner 202 stops, which occurs when it has finished the last record in the metadata.

Figure 3:
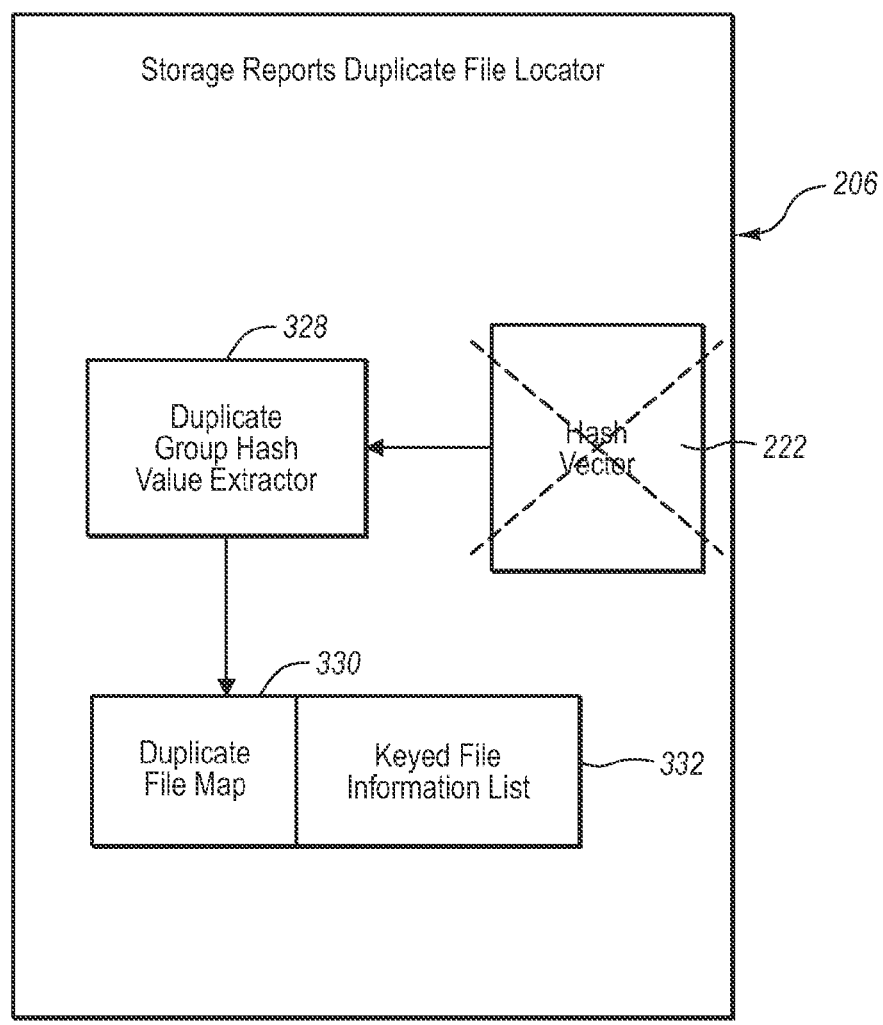
FIG. 3 is a block diagram generally representing example components of a storage reports duplicate file locator, in accordance with various aspects of the present invention.
Figure 5:
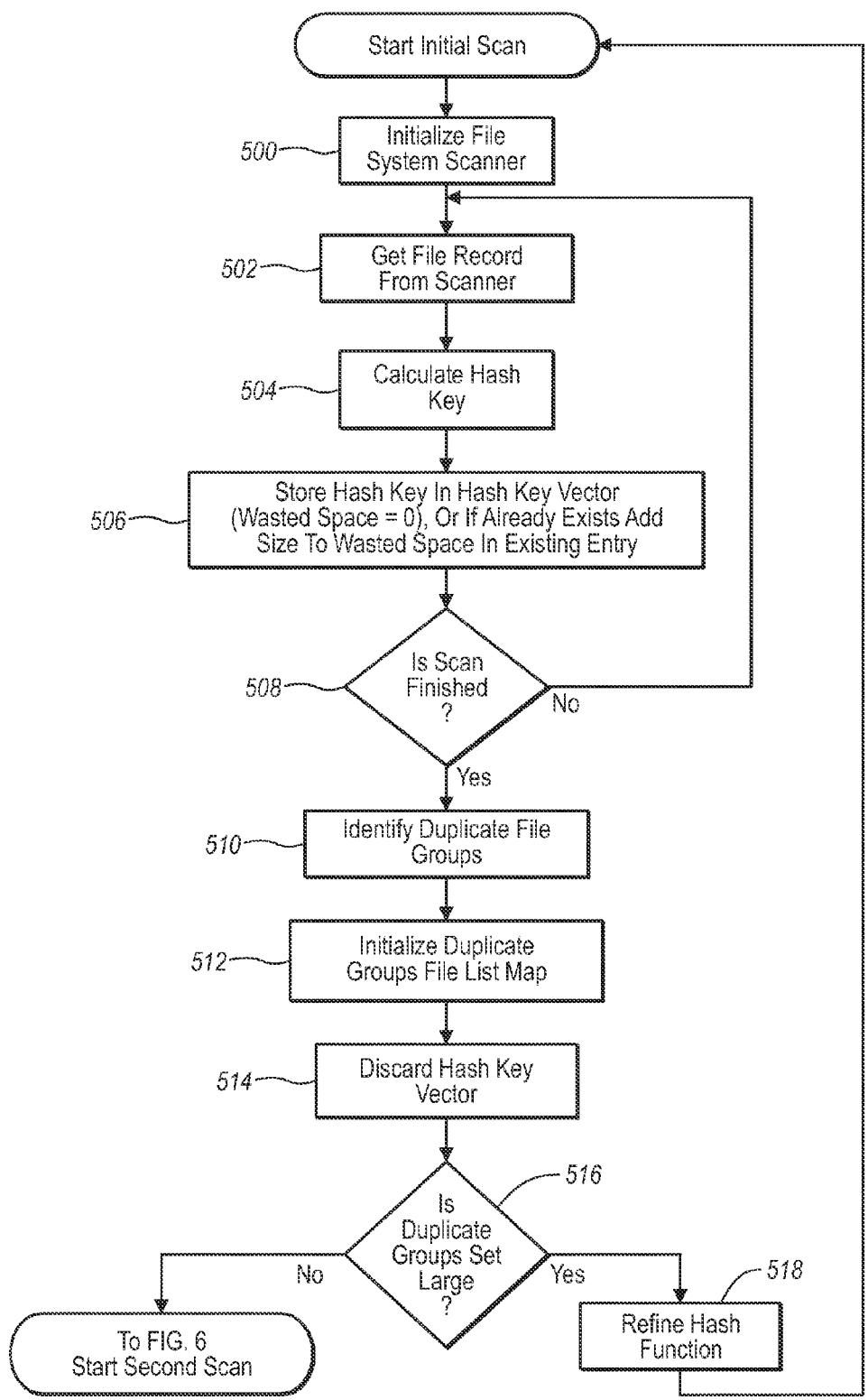
FIGS. 5 and 6 comprise a flow diagram generally representing example steps for efficiently detecting duplicate files for generating storage reports, in accordance with various aspects of the present invention.

A next step in the process comprises duplicate group identification, generally represented in FIG. 3 and continuing the flow diagram of FIG. 5. In group identification, the hash key vector 222 is processed, e.g., by duplicate group hash value extractor logic 328, to build a duplicate file map 330.

In general, the duplicate hash values, called duplicate groups, are extracted from the hash key vector. As described above, in one implementation, duplicate groups may be identified by any hash keys that do not have zero wasted space associated with them (step 510). The key values of duplicate groups are used to initialize a mapping between each value and a list 332 of file information structures (step 512). In one implementation, this is performed by sorting the hash key vector, and then extracting the duplicated values into a hash table that maps the hash key to an initially empty sorted list 332 of file information structures.

Note that some additional filtering may be done at this time, depending on the requested report. For example, if the report is only to list the one-thousand files that waste the most space, there is no need to keep more than the top one-thousand after sorting, plus possibly some percentage extra in case false positives (files that had attributes that hashed alike but are not actually duplicates) exist. The file information structure list is sorted to more efficiently identify false positives (resulting from hash collisions between files that are not actually duplicates) in a later operation, described below.

Step 514 represents discarding the hash key vector 222 to reclaim memory and/or storage. This is also represented in FIG. 3 by the dashed lines crossing out the hash vector 222.

Depending on the hash function size, hash function inputs used, and the number of files, it is possible that the number of duplicate groups will be relatively large. If so, the set of parameters to the initial hashing function can be further expanded to include other criteria, e.g., last modification time, security information, general file flags and attributes, or any combination of these or other file characteristics. The hash key width can also be expanded to 128-bit, or some other width. Then, the scan may be repeated using the new hashing function. Note that one optimization is to retain the set of hash keys identifying the duplicate groups, and only perform the enhanced hash algorithm on files matching the initial duplicate groups. An alternative optimization is to count the duplicate groups while detected, e.g., following step 506 when adding the size to zero, and then end the scan earlier if the number exceeds some threshold and restart with a refined hash function.

Moreover, given an extremely large number of files, it is possible that there are not enough resources to complete the first scan for every file. For example, files on the order of hundreds of million, each requiring 128 bits (64 bits for the key, 64 for the size), will consume large amounts of memory and storage that can overwhelm a given system. One solution is to perform multiple "first" scans, each one keeping only hash values that fall within a range of hash haves for that scan. Only the duplicates within that range are then kept, freeing resources. The next "first" scan uses the next range of hash values, and so forth, until only duplicates remain. The process repeats until the entire range of possible hash values has been covered. An alternate solution is to use a temporary database, e.g., which persists on disk and whose record's key is the hash value.

At this time, the duplicate groups are known. Essentially, the first scan and duplicate group identification operations are for the purpose of establishing which files hash such that they are candidates for duplicates that will match the report's criteria, and which can be immediately discarded as being certain singletons. Additional filtering is also possible as described above.

Because due to resource limitations only the hash values for duplicate groups was kept, it is necessary to find which files correspond to the hash values, and preserve the information for those files. Note that this ordinarily will be a far lesser number than the total number of files on a volume, whereby the system resources will not be overwhelmed by saving this additional information.

To determine the files that match the hash values that indicated duplicates, a second scan is performed, in which a second file system metadata scan again calculates the hash key for each file residing in the volume namespace or namespaces of interest. If the hash key is in the hash map, the file information is extracted and placed in the keyed file information list.

Figure 4:
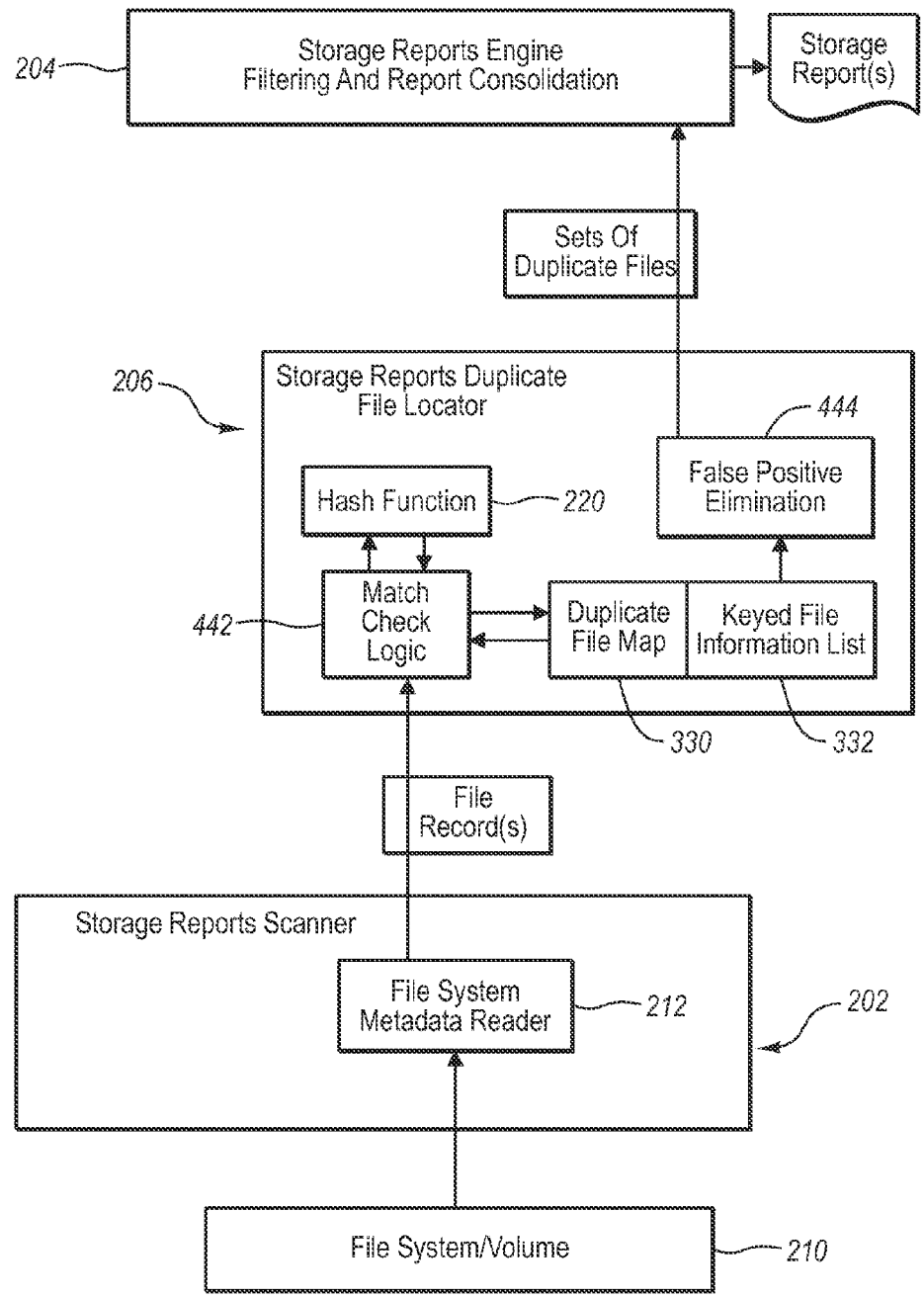
FIG. 4 is a block diagram representing various components for efficient execution of a second volume scan to generate storage reports of duplicate files, in accordance with various aspects of the present invention.
Figure 6:
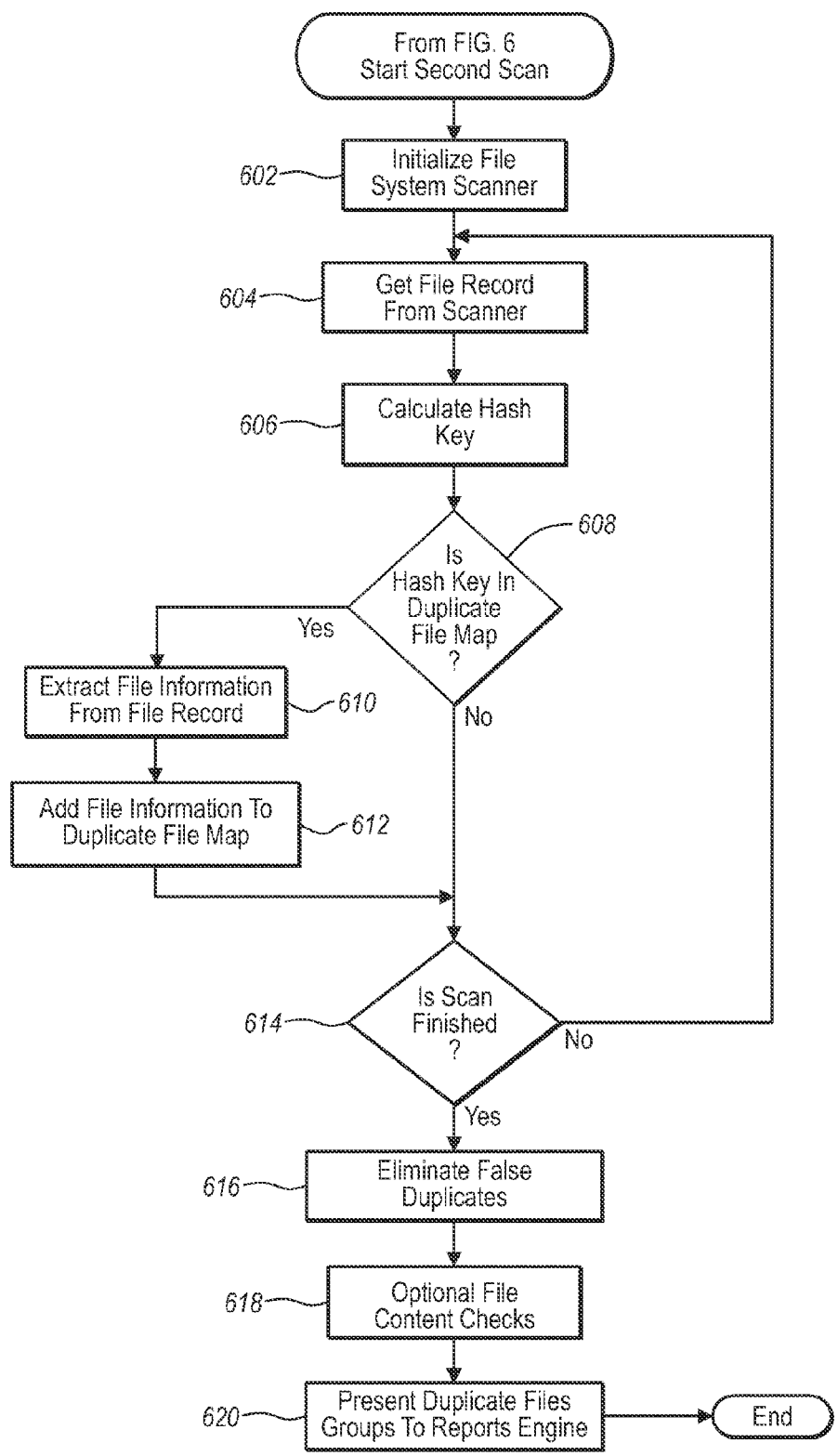

FIG. 4 and the flow diagram of FIG. 6 summarizes the second scan and resultant operations, beginning with step 602 which initializes the file system scanner 202, e.g., with the namespace or namespaces of interest. Step 604 represents receiving a file record from the scanner 202, and step 604 represents calculating the hash key value for the file record.

Step 608, as also represented in FIG. 4 via match check logic 442, evaluates whether the duplicate file map 330 for the duplicate group has an entry that matches the calculated hash key value. If not found, the file record is discarded, and another file record retrieved via step 614 looping back to step 604.

If a match is found at step 608, file information is extracted from the file record (step 610) and added to the file information list 332 associated with the duplicate file map 330. Such information may include file ID, filename, and so forth. Step 614 repeats the scan until all records have been processed.

When the scan is complete, step 616 represents the elimination of false positives (resulting from hash collisions). In one example operation, each file information list in the hash map may be processed to remove files whose properties match no other file in the list. This can occur when two files have different property sets that happen to hash to the same hash key value. As represented by step 618, a third (optional) scan may take place, in which each file information list in the hash map is processed to remove files whose content matches no other file in the list. Content screening can be done in one of a number of ways, including comparison of file content header information, comparison of file content at several randomly chosen offsets in the files, comparison of file content checksums, and even a full bitwise comparison of file content. Note that when false positives are eliminated, file sets that were previously considered as having wasted the most space may no longer be considered duplicates, and it is possible to have duplicates remain, e.g., of four initial candidate files, three are duplicates and one is not, or even two sets of two duplicates may exist.

Step 620 represents the presentation of results to the engine 204. In general, the duplicate file locator 206 may present the engine with any suitable, agreed upon format, such as an array containing the resultant set of sorted file information lists from the hash map/keyed file information list 330, 332.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment a method for performing time and memory efficient detection of duplicate files in a file system, the method comprising:
    performing a first scan of a plurality of files in a file system wherein the scan retrieves metadata from each file;
    retrieving file information from the metadata, the file information comprising a set of attributes for each file;
    performing a hash of at least one attribute of the set for each file into a hash value;
    storing the hash value in a hash vector;
    prior to storing the hash value in the hash vector, and upon determining that the hash vector already contains an entry corresponding to the hash value, incrementing a data value associated with the hash value, the data value representing an occurrence of at least some potentially duplicate files, said potentially duplicate files including at least one duplicate file;
    creating an entry in a duplicate file map that corresponds to said potentially duplicate files;
    discarding the hash vector;
    performing a second scan of the plurality of files to locate file information for at least some of the potentially duplicate files that correspond to the entry in the duplicate file map, including file information for said at least one duplicate file; and
    determining from the file information which files from among the groups of potentially duplicate files are actual duplicate files of at least one other file, including said at least one duplicate file.

2. The method of claim 1 wherein retrieving metadata from each file comprises receiving a record for each file.

3. The method of claim 1 wherein hashing at least one attribute comprises using as an input to a hash function at least one item of a set, the set containing time-related information, file size-related information, and file security-related information or other file metadata.

4. The method of claim 1 wherein the data value corresponds to an amount of wasted space associated with the hash value and wherein incrementing the data value comprises incrementing the data value by an amount representative of a size of the file.

5. The method of claim 4 further comprising:
    upon completion of the first scan, eliminating entries in the hash vector for which the corresponding data value indicates that no duplicative files exist.

6. The method of claim 4 wherein determining from the data value that the hash value corresponds to groups of potentially duplicate files comprises sorting to eliminate each entry having a data value of zero.

7. The method of claim 1 wherein performing second scan comprises performing the same hash to obtain a hash value for each file, and obtaining the file information for that file when the hash value matches a hash value corresponding to one of the duplicate groups of potentially duplicate files.

8. The method of claim 1 wherein determining from the file information which files from among the groups of potentially duplicate files are actual duplicate files of at least one other file comprises, performing a hash function on each group that uses as an input at least one attribute not used in a previous hash computation.

9. The method of claim 1 wherein determining from the file information which files from among the groups of potentially duplicate files are actual duplicate files of at least one other file comprises, comparing at least some contents of the files in a group.

10. In a computing environment, a system comprising:
    a storage reports engine;
    a storage reports scanner configured to scan a plurality of files in a file system;
    a storage reports duplicate file locator coupled to the storage reports engine and to the storage reports scanner, the storage reports duplicate file locator receiving file records from the storage reports scanner; and
    storage media storing computer-executable instructions configured for performing a method comprising:
        performing a first scan of a plurality of files in a file system wherein the scan retrieves metadata from each file;
        retrieving file information from the metadata, the file information comprising a set of attributes for each file;
        performing a hash of at least one attribute of the set for each file into a hash value;
        storing the hash value in a hash vector;
        prior to storing the hash value in the hash vector, and upon determining that the hash vector already contains an entry corresponding to the hash value, incrementing a data value associated with the hash value, the data value representing an occurrence of at least some potentially duplicate files, said potentially duplicate files including at least one duplicate file;
        creating an entry in a duplicate file map that corresponds to said potentially duplicate files;
        discarding the hash vector;
        performing a second scan of the plurality of files to locate file information for at least some of the potentially duplicate files that correspond to the entry in the duplicate file map, including file information for said at least one duplicate file; and
        determining from the file information which files from among the groups of potentially duplicate files are actual duplicate files of at least one other file, including said at least one duplicate file.

11. The system of claim 10 wherein the storage reports duplicate file locator eliminates non-duplicates by removing entries from the hash vector that have a corresponding data value equal to zero after completion of the first scan.

12. The system of claim 11 wherein the storage reports duplicate file locator creates a duplicate file map between each hash value and a list of file information structures.

13. The system of claim 10 wherein the data value corresponds to an amount of wasted space associated with the hash value and wherein incrementing the data value comprises incrementing the data value by an amount representative of a size of the file.

14. The system of claim 12 wherein the storage reports duplicate file locator locates the file information by performing another hash of the attribute set for each file detected by the second scan to determine if a file corresponds to an entry in the duplicate file map, and if so, maintaining information for that file in a corresponding file information structure in the list.

15. The system of claim 10 wherein the storage reports duplicate file locator includes means for determining which files from groups of potentially duplicate files comprise actual duplicate files.

16. At least one computer-readable storage medium having stored computer-executable instructions, which are configured to implement a method for detecting duplicate files in a file system, the method comprising:
   (a) performing a first scan of a plurality of files in a file system wherein the scan retrieves metadata from each file;
   (b) retrieving file information from the metadata, the file information comprising a set of attributes for each file;
   (c) performing a hash of at least one attribute of the set for each file into a hash value;
   (d) storing the hash value in a hash vector;
   (e) upon determining that the hash vector contains an entry corresponding to the hash value, incrementing a data value associated with the hash value, the data value representing an occurrence of at least some potentially duplicate files, said potentially duplicate files including at least one duplicate file;
   (f) upon completion of the first scan, eliminating entries in the hash vector for which the corresponding data value indicates that no duplicative files exist;
   (g) determining from the data value that the hash value corresponds to groups of potentially duplicate files and creating an entry in a duplicate file map that corresponds to said potentially duplicate files;
   (h) discarding the hash vector;
   (i) performing a second scan of the plurality of files to locate file information for at least some of the potentially duplicate files that correspond to the entry in the duplicate file map including file information for said at least one duplicate file; and
   (j) determining from the file information which files from among the groups of potentially duplicate files are actual duplicate files of at least one other file, including said at least one duplicate file.

17. The computer-readable storage medium of claim 16 wherein the data value corresponds to an amount of wasted space associated with the hash value and wherein incrementing the data value comprises incrementing the data value by an amount-representative of a size of the file.

18. The computer-readable storage medium of claim 17 having further stored computer-executable instructions for performing the method comprising:
   generating a list of files based upon which sets of file duplicates waste the most space.

19. The computer-readable storage medium of claim 16 wherein hashing at least one attribute comprises using as an input to a hash function at least one item of a set, the set containing time-related information, file size-related information, and file security-related information.

20. The computer-readable storage medium of claim 16 wherein eliminating values entries in the hash vector results in reclaiming system resources.

21. The computer-readable storage medium of claim 16 wherein steps (a)-(f) are repeated a plurality of times, each time corresponding to a differing range of hash values that corresponds to a subset of the full range of hash values, until the full range of hash values has been processed.

22. The computer-readable storage medium of claim 16 to a database the hash vector is maintained in at least one persistent storage device.

* * * * *